(12) United States Patent
Muhanna et al.

(10) Patent No.: US 10,129,208 B2
(45) Date of Patent: *Nov. 13, 2018

(54) METHODS PROVIDING PUBLIC REACHABILITY AND RELATED SYSTEMS AND DEVICES

(71) Applicant: TELEFONAKTIEBOLAGET LM ERICSSON (PUBL), Stockholm (SE)

(72) Inventors: Ahmad Muhanna, Richardson, TX (US); Zu Qiang, Kirkland (CA); Dinand Roeland, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,830

(22) Filed: Dec. 5, 2016

(65) Prior Publication Data

US 2017/0094505 A1 Mar. 30, 2017

Related U.S. Application Data

(63) Continuation of application No. 13/211,485, filed on Aug. 17, 2011, now Pat. No. 9,515,986.

(Continued)

(51) Int. Cl.
*H04L 29/12* (2006.01)
*H04W 12/02* (2009.01)
(Continued)

(52) U.S. Cl.
CPC ...... *H04L 61/2575* (2013.01); *H04L 61/2514* (2013.01); *H04L 63/0272* (2013.01);
(Continued)

(58) Field of Classification Search
CPC ..... H04W 12/04; H04W 12/02; H04W 12/08; H04W 12/10; H04L 61/2575;
(Continued)

(56) References Cited

U.S. PATENT DOCUMENTS

2002/0085540 A1    7/2002  Hyvarinen
2006/0101026 A1    5/2006  Fukushima
(Continued)

FOREIGN PATENT DOCUMENTS

CN    1501644 A    6/2004
EP    1307014 A    5/2003
(Continued)

OTHER PUBLICATIONS

Rosenberg, J. et al., STUN-Simple Traversal of User Datagram Protocol (UDP) Through Network Address Translators (NATs), RFC 3489, Mar. 1, 2003.
(Continued)

*Primary Examiner* — Mandish Randhawa

(57) ABSTRACT

A method of obtaining addressing information may include establishing a communication path through a network between first and second peer devices with a router coupled between the first peer device and the communication path through the network. A communication may be received at the first peer device from the second peer device through the communication path and the router. Moreover, a payload of the communication received at the first peer device from the second peer device may include a public reachability address used by the second peer device to transmit the communication through the network and the router to the first peer device. Related methods of providing such addressing information and related devices are also discussed.

18 Claims, 7 Drawing Sheets

Related U.S. Application Data

(60) Provisional application No. 61/482,684, filed on May 5, 2011.

(51) Int. Cl.
  *H04W 12/10* (2009.01)
  *H04L 29/06* (2006.01)
  *H04W 12/08* (2009.01)
  *H04W 12/04* (2009.01)

(52) U.S. Cl.
  CPC ............ *H04L 63/04* (2013.01); *H04L 63/061* (2013.01); *H04L 63/20* (2013.01); *H04W 12/02* (2013.01); *H04W 12/04* (2013.01); *H04W 12/08* (2013.01); *H04W 12/10* (2013.01)

(58) Field of Classification Search
  CPC . H04L 63/0272; H04L 61/2514; H04L 63/20; H04L 63/04; H04L 63/061
  See application file for complete search history.

(56) References Cited

U.S. PATENT DOCUMENTS

| | | |
|---|---|---|
| 2006/0274741 A1 | 12/2006 | Wing et al. |
| 2010/0138560 A1 | 6/2010 | Kivinen et al. |
| 2011/0047261 A1 | 2/2011 | Gobara et al. |
| 2011/0103310 A1 | 5/2011 | Stojanovski et al. |
| 2014/0129839 A1* | 5/2014 | So .................. H04L 61/2514 713/171 |
| 2014/0195655 A1* | 7/2014 | Jha .................. H04L 61/2575 709/220 |

FOREIGN PATENT DOCUMENTS

| | | |
|---|---|---|
| JP | 2010087612 A | 4/2010 |
| WO | 0078008 A1 | 12/2000 |
| WO | 2009051528 A1 | 4/2009 |
| WO | 2010052157 A1 | 5/2010 |
| WO | 2010052169 A1 | 5/2010 |

OTHER PUBLICATIONS

Kivinen, et al., Negations of NAT-Traversal in the IKE, RFC 3947, Jan. 1, 2005.
So, et al., IKEv2 Configuration Payload Extension for Private IPv4 Support for Fixed Mobile Convergence, draft-so-ipsecme-ikev2-cpect-01.txt, Internet Engineering Task Force, Feb. 8, 2012.
Gearbox Computers, IP Watcher 3.0.030 Monitor Your Public IP Address for Changes, Nov. 13, 2009. Retrieved from the Internet: www.gearboxcomputers.com/products/ipwatcher/.
C. Kaufman et al. "Internet Key Exchange Protocol Version 2 (IKEv2)", RFC5996, Sep. 2010, pp. 1-138.
C. Kaufman "Internet Key Exchange (IKEv2) Protocol", RFC4306, Dec. 2005, pp. 1-99.
J. Rosenberg et al. "Session Traversal Utilities for NAT (STUN)", RFC5389, Oct. 2008, pp. 1-51.

* cited by examiner

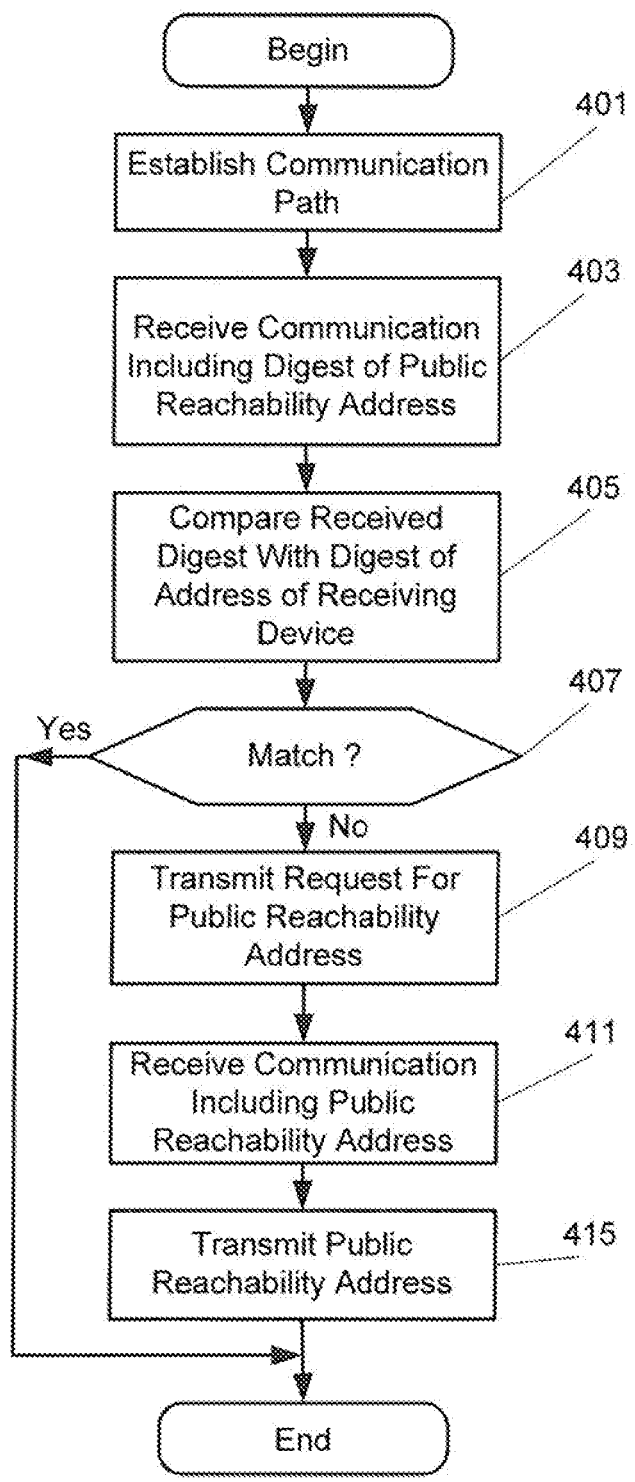

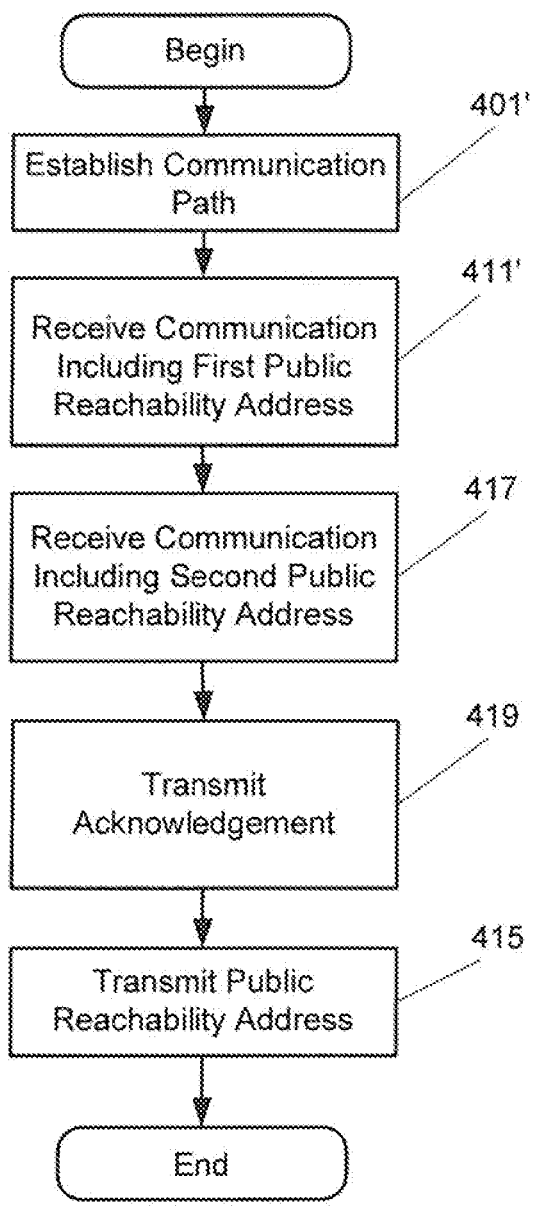

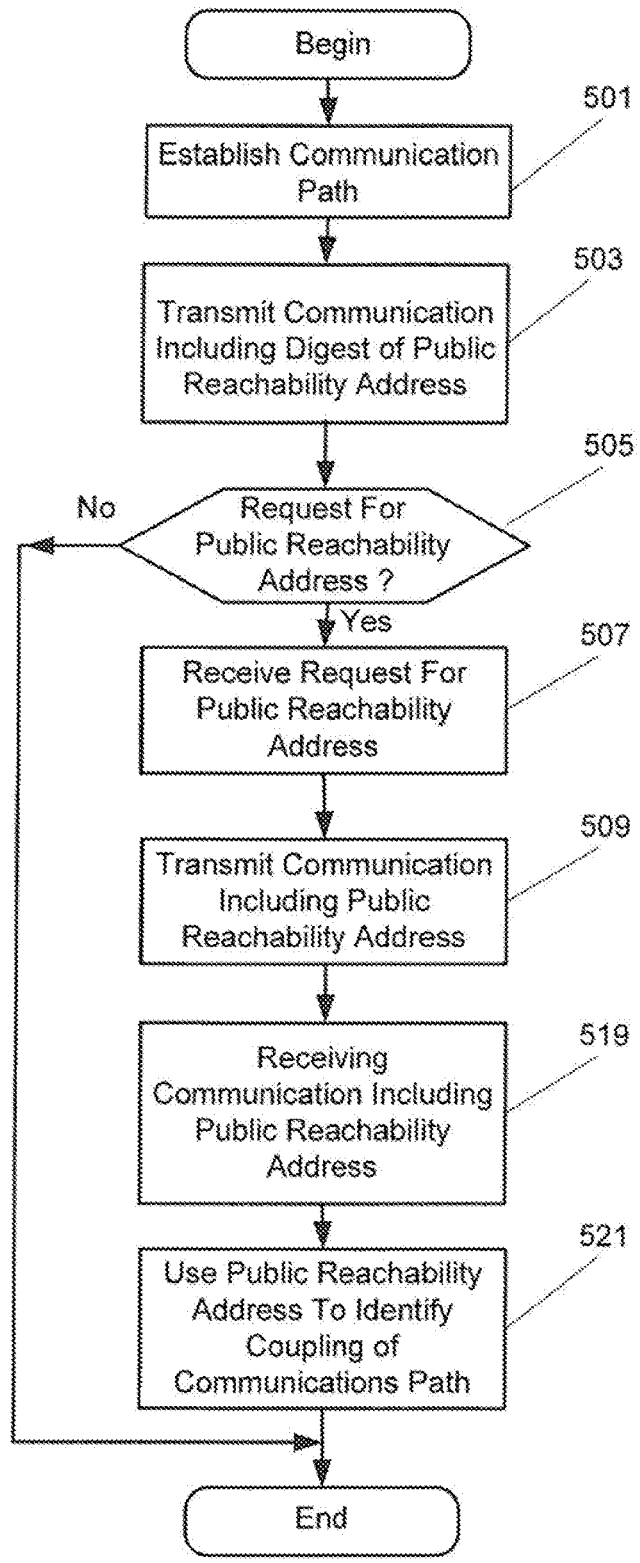

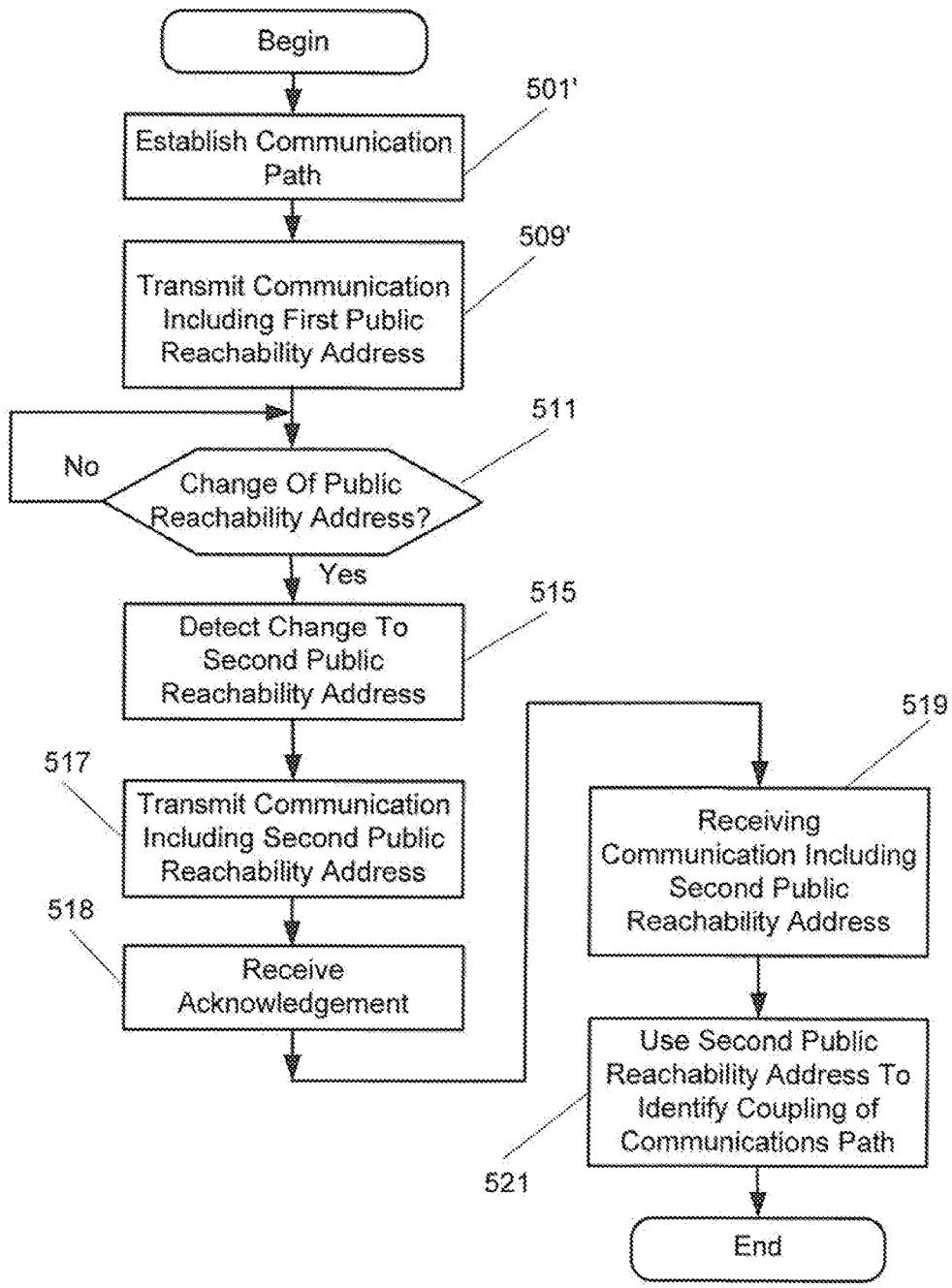

FIGURE 6

| R | Attr. AT-EXT-NAT-Info | Length |
|---|---|---|
| | Protocol Type | Source Port # |
| | IPv4 Address = NAT Public IPv4 Address | |

AT-External-NAT-Info Configuration Protocol (CP) Format

METHODS PROVIDING PUBLIC REACHABILITY AND RELATED SYSTEMS AND DEVICES

RELATED APPLICATION

The present application is a continuation of U.S. application Ser. No. 13/211,485, filed Aug. 17, 2011, now U.S. Pat. No. 9,515,986, which claims the benefit of priority of U.S. Provisional Application No. 61/482,684 filed May 5, 2011, the disclosures of which are fully incorporated herein by reference.

TECHNICAL FIELD

The present disclosure is directed to communications and, more particularly, to network communications and related devices and systems.

BACKGROUND

In a typical cellular radio system, wireless terminals (also referred to as wireless mobile terminals, user terminals and/or user equipment nodes or UEs, mobile stations, etc.) communicate via a wireless communications network (also referred to as a wireless network, a radio access network, and/or a RAN) with one or more core networks. The wireless network covers a geographical area which is divided into cell areas, with each cell area being served by a RAN node, e.g., a radio base station (BS), which in some networks is also called a "NodeB" or enhanced NodeB "eNodeB." A cell area is a geographical area where radio coverage is provided by the base station equipment at a base station site. Each base station communicates over an air interface using radio communication channels with UEs within the coverage area of the base station. The type of radio communication channels utilized between a base station and a UE define the radio access technology (RAT). There are circuit-switched radio access technologies that support circuit-switched operations, for example CDMA (code division multiple access) or GSM (Global System for Mobile Communications), and there are packet-data radio access technologies that support packet-data operations, for example High Rate Packet Data (HRPD), Long Term Evolution (LTE), and/or Third Generation Partnership Project (3GPP/3GPP2). A Radio Access Network may provide voice and/or data communication for subscriber wireless terminals.

Base stations of a wireless network may be arranged to provide overlapping cell areas over a geographical area of coverage. Conventional outdoor base stations, however, may provide insufficient coverage indoors. Accordingly, customer premises base stations (also referred to as customer premises eNodeBs) may be used to boost coverage in indoor environments. A customer premises base station, for example, may be coupled to a wireless network, for example, through a broadband network to facilitate wireless communications and/or handoffs to/from conventional outdoor base stations.

For example, a customer may install a customer premises base station in a home using a residential internet connection through a broadband network to provide communications between the customer premises base station and the wireless network. While the customer premises base station has an unconventional coupling with the wireless network (as compared with conventional outdoor base stations operated directly by the wireless network), the customer premises base station may provide a wireless interface that is transparent with respect to the customer's wireless terminal or terminals (e.g., cellular radiotelephone(s), smartphone(s), tablet/netbook/laptop computer(s), etc.). Accordingly, the wireless network may maintain a communication with the customer's wireless terminal (e.g., a telephone conversation, internet browsing session, etc.) when the wireless terminal moves between indoor and outdoor environments by handing off service between the customer premises and conventional base stations.

More particularly, a customer premises router may provide a data communications path between the customer premises (e.g, the customer's home) and the broadband network (e.g., using a modem such as a Digital Subscriber Line or DSL modem, a cable modem, etc.) to provide broadband data access for multiple devices at the customer premises. In addition to the customer premises base station, the customer premises router may be coupled to additional other devices at the customer premises (e.g., computing devices, VoIP phones, gaming devices, etc.). Accordingly, public reachability addresses may be used by the broadband network to address data communications to devices at the customer premises, and the router may then use private addresses to address the communications to the different devices at the customer premises. More particularly, a public reachability address may include an Internet Protocol or IP address for the router (e.g., an IPv4 address) and a User Datagram Protocol (UDP) port number of the router associated with a device at the customer premises. Stated in other words, the router may act as a Network Address Translation (NAT) device, and the customer premises base station may thus be unaware of the public reachability address that is used by the broadband network to direct communications for the customer premises base station.

In such a situation, the customer premises base station may act as a client/host behind the router which acts as a NAT device, and the customer premise base station may need to communicate its public reachability address (e.g., its NAT public IPv4 address and source UDP port number) to a node or nodes of the broadband and/or wireless network(s). For example, the customer premises base station may need to provide its public reachability address to a policy controller at the broadband and/or wireless network(s).

A customer premises base station operating through a customer premises router may thus need to be aware of its public reachability address. Moreover, a customer premises base station operating through a customer premises router may need to repeatedly send keep-alive messages at an interval that is less than a time-out interval of the customer premises router so that the same public reachability address of the customer premises base station may be maintained, and/or so that the customer premises base station is continuously available to accept wireless terminal communications, hand-offs, calls, etc. If a communication coupling between the customer premises base station and the wireless communication network is interrupted (e.g., due to inactivity), a new public reachability address for the customer premises base station may be assigned when communication for the customer premises base station is reestablished, and/or calls may be interrupted and/or missed.

A customer premises base station may thus be coupled to a wireless communication network (e.g., to a 3GPP Evolved Packet Core) through a customer premises router and through a broadband network, and the customer premises base station may thus need to communicate its public reachability address to a policy and charging rules function (PCRF) server of the wireless network. More particularly, the customer premises base station may be coupled to a Security Gateway of the wireless network using an IPsec tunnel through the broadband network. The PCRF server may in turn use the public reachability address to identify a fixed connection through the broadband network that is assigned to the customer premises base station for policy enforcement. Conventionally, there is no control interface between the Security Gateway and a Mobility Management Entity (MME) of the wireless network, and the customer premises base station may transmit its public reachability address to the MME via a control interface that is routed through the IPsec tunnel.

While the IETF STUN protocol may allow a host/client behind a NAT device to discover its NAT public IPv4 address and source UDP port that are being used for a host session (see, Rosenberg et al., Session Traversal Utilities for NAT (STUN), RFC 5389, October 2008), the IETF STUN and IKE protocols are separate protocols. On the other hand, IETF RFC's 4306 and 5996 may allow an IKEv2 peer (e.g., customer premises base station and/or wireless network security gateway) to discover whether it is behind a NAT device using IKEv2 signaling. See, Kaufman, Internet Key Exchange (IKEv2) Protocol, RFC 4306, December 2005, and Kaufman, et al., Internet Key Exchange Protocol Version 2 (IKEv2), RFC 5996, September 2010. IETF protocols, however, may fail to provide suitable capability for a host/client device such as a customer premises base station behind a NAT device to securely discover and/or communicate its IPv4 public reachability address and source UDP port that is assigned to its current communication session.

SUMMARY

According to some embodiments, a method of obtaining addressing information may include establishing a communication path through a network between first and second peer devices with a router coupled between the first peer device and the communication path through the network. A communication may be received at the first peer device from the second peer device through the communication path and the router. More particularly, a payload of the communication received at the first peer device from the second peer device may include a public reachability address used by the second peer device to transmit the communication through the network and the router to the first peer device. By way of example, the communication path may include an Internet protocol (IP) security (IPsec) tunnel between the router and the second peer device. Although such an IPsec tunnel may be effectively between the first and second peer devices with the IPsec tunnel being NATed (Network Address Translated) through the router, the IPsec tunnel (or portions thereof) may be referred to as being between the router and the second peer device. Stated in other words, the communication path may be provided as a portion of an IPsec tunnel between the router and the second peer device.

The second peer device is aware of the public reachability address of the first peer device because the second peer device uses this public reachability address in an address field of any communication that is transmitted to the first communication device. Accordingly, by providing the public reachability address in a payload element(s)/field(s) of a communication (that also includes the public reachability address in an address field or fields), the public reachability address of the first peer device can be efficiently transmitted to the first peer device, and the public reachability address (in the payload element) will reach the first peer device whether network address translation occurs (e.g., at an intervening router) or not. In addition, a security of the communication may be enhanced by transmitting the public reachability address in the communication over an IPsec tunnel. Once the first peer device has received its public reachability address, the first peer device can transmit its public reachability address to other network elements (e.g., a mobility management entity, a PCRF server, a BPCF server, etc.) as may be useful, for example, to provision network resources for the communication path between the router and the second peer device. The second peer device, for example, may transmit the communication including the public reachability address responsive to a request from the first peer device and/or responsive to determining that the public reachability address for the first peer device has changed.

According to some other embodiments, a method of providing addressing information may include establishing a communication path through a network between first and second peer devices with a router coupled between the second peer device and the communication path through the network. A communication may be transmitted from the first peer device to the second peer device through the communication path and the router. More particularly, a payload of the communication may include a public reachability address used by the first peer device to transmit the communication through the network and the router to the second peer device. By way of example, the communication path may include an Internet protocol (IP) security (IPsec) tunnel between the first peer device and the router. Although such an IPsec tunnel may be effectively between the first and second peer devices with the IPsec tunnel being NATed (Network Address Translated) through the router, the IPsec tunnel (or portions thereof) may be referred to as being between the first peer device and the router. Stated in other words, the communication path may be provided as a portion of an IPsec tunnel between the first peer device and the router.

According to still other embodiments, a first peer device may be configured to communicate with a second peer device through a router and a network, and the first peer device may include a network interface and a processor coupled to the network interface. The network interface may be configured to establish a communication path through the network between the first and second peer devices with the router coupled between the first peer device and the communication path through the network. The processor may be configured to receive a communication from the second peer device through the communication path, through the router, and through the network interface. More particularly, a payload of the communication may include a public reachability address used by the second peer device to transmit the communication through the network and the router to the first peer device. By way of example, the communication path may include an Internet protocol (IP) security (IPsec) tunnel between the router and the second peer device. Although such an IPsec tunnel may be effectively between the first and second peer devices with the IPsec tunnel being NATed (Network Address Translated) through the router, the IPsec tunnel (or portions thereof) may be referred to as being between the router and the second peer device. Stated in other words, the communication path may be provided as a portion of an IPsec tunnel between the router and the second peer device.

According to yet other embodiments, a first peer device may be configured to communicate with a second peer device through a network and a router, and the first peer device may include a network interface and a processor coupled to the network interface. The network interface may be configured to establish a communication path through the network between the first and second peer devices with the router coupled between the second peer device and the communication path through the network. The processor may be configured to transmit a communication through the network interface, through the communication path, and through the router to the second peer device. More particularly, a payload of the communication may include a public reachability address used by the processor to transmit the communication through the network interface, through the network, and through the router to the second peer device. By way of example, the communication path may include an Internet protocol (IP) security (IPsec) tunnel between the first peer device and the router. Although such an IPsec tunnel may be effectively between the first and second peer devices with the IPsec tunnel being NATed (Network Address Translated) through the router, the IPsec tunnel (or portions thereof) may be referred to as being between the first peer device and the router. Stated in other words, the communication path may be provided as a portion of an IPsec tunnel between the first peer device and the router.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 4A and 5A are flow charts illustrating operations of elements of FIGS. 1-3 according to some embodiments; and FIGS. 4B and 5B are flow charts illustrating operations of elements of FIGS. 1-3 according to some other embodiments.

FIG. 6 is a block diagram illustrating a format of an AT-External-NAT-Info CP attribute according to some embodiments.

DETAILED DESCRIPTION

Figure 1:
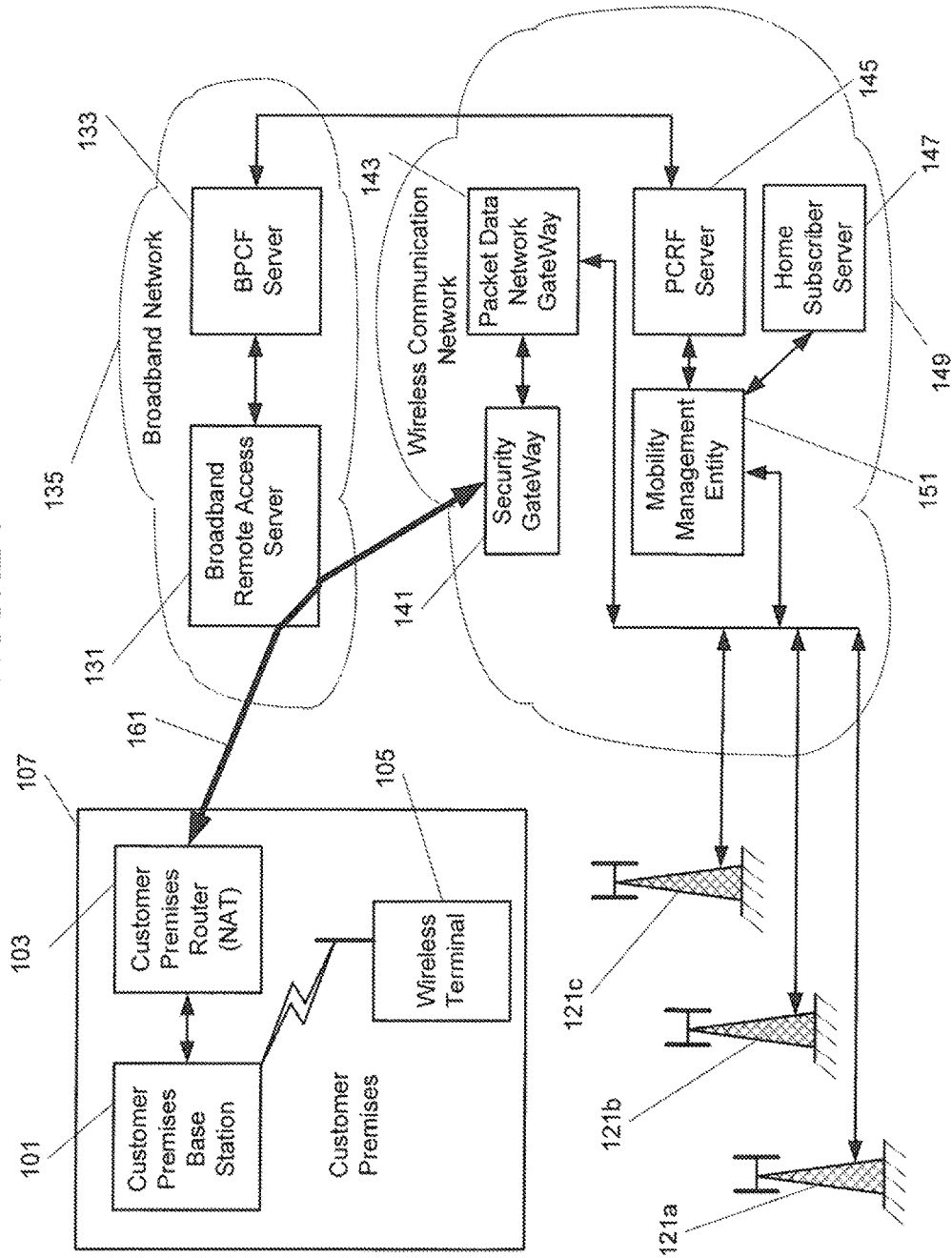
FIG. 1 is a block diagram of communication networks and devices according to some embodiments.

Embodiments of the present invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in one or more other embodiments.

For purposes of illustration and explanation only, these and other embodiments of the present invention are described herein in the context of operating with a wireless network that communicates over radio communication channels with wireless terminals (also referred to as wireless mobile terminals, user terminals, user equipment nodes or UEs, mobile stations, etc.). It will be understood, however, that the present invention is not limited to such embodiments and may be embodied generally in any type of communication network. As used herein, a wireless terminal can include any device that receives data from and/or transmits data to a communication network, and may include, but is not limited to, a mobile radiotelephone ("cellular" telephone), laptop/portable computer, pocket computer, handheld computer, and/or desktop computer.

In some embodiments of a wireless network, several base stations can be connected (e.g., by landlines or radio channels) to a mobility management entity and/or a packet data network gateway of a wireless network. Elements of the wireless network may supervise and coordinate various activities of the plural base stations connected thereto, and elements thereof may be connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a wireless communication network using wideband code division multiple access for wireless terminals.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP (3rd Generation Partnership Project) LTE (Long Term Evolution) is used in this disclosure to exemplify embodiments of the invention, this should not be seen as limiting the scope of the invention to only these systems. Other Radio Access Network systems, including WCDMA (Wideband Code Division Multiple Access), WiMax (Worldwide Interoperability for Microwave Access), CDMA2000 and GSM (Global System for Mobile Communications), may also benefit from exploiting embodiments of the present invention disclosed herein.

Also note that terminology such as eNodeB (Evolved Node B) and UE (User Equipment) should be considering non-limiting and does not imply a certain hierarchical relation between the two. In general an "eNodeB" and a "UE" may be considered as examples of respective different communications devices that communicate with each other over radio communication channels. While embodiments discussed herein may focus on a service device initiating communications with an application server, embodiments may be applied, for example, where the application server initiates the communication with the service device.

FIG. 1 is a block diagram illustrating communication networks, devices, and elements thereof according to some embodiments. Wireless communication network 149, for example, may provide communications services for wireless terminals over an air interface provided through a plurality of base stations, including base stations 121a-c, and wireless communication network 149 may include security gateway 141, packet data network gateway 143, Policy and Charging Rules Function (PCRF) Server 145, home subscriber server 147, and Mobility Management Entity (MME) 151. Wireless network 149 covers a geographical area which is divided into cell areas with each cell area being served by a respective base station (e.g., including base stations 121a-c), and each base station communicates over an air interface through radio communication channels with wireless terminals within the cell area of the base station.

Conventional outdoor base stations 121a-c, however, may not provide adequate service for wireless terminal 105 within a customer premises 107 (e.g., in a house, an office, or other building/structure), and a customer premises base station 101 may provide improved service for wireless terminal 105 when operating within customer premises 107. Customer premises base station 101 communicates with wireless terminal 105 using the same air interface and the same radio communication channel(s) used by base stations 121a-c operated directly by wireless network 143. Accordingly, customer premises base station 101 may provide service for wireless terminal 105 when the wireless terminal 105 is in/near the customer premises 107, and base stations 121a-c may provide service for wireless terminal 105 when the wireless terminal is outside and/or away from customer premises 107. Operation of customer premises base station 101 may be transparent with respect wireless terminal 105 so that wireless terminal 105 may use conventional techniques to select a conventional base station 121a-c and/or wireless terminal 105 for communications. Stated in other words, customer premises base station 101 and wireless network base stations 121a-c may operate according to a same Radio Access Technology or RAT.

A coupling between customer premises base station 101 and wireless network 149, however, may be different than couplings between base stations 121a-c and wireless network 149. Base stations 121a-c, for example, may be coupled directly to wireless network 149 and/or elements thereof, but customer premises base station 101 may be coupled indirectly to wireless communication network 149 through customer premises router 103 and/or broadband network 135. More particularly, broadband network 135 may include broadband remote access server 131 that is configured to provide communications path 161 between customer premises router 103 and security gateway 141 of wireless network 149. For example, broadband remote access server 131 may be configured to provide communication path 161 as an Internet Protocol Security (IPsec) tunnel in accordance with an Internet Key Exchange IKE protocol such as IKEv2 between customer premises router 103 and security gateway 141. Although such an IPsec tunnel may be effectively between customer premises base station 101 (a first IKEv2 peer device) and security gateway 141 (a second IKEv2 peer device) with the IPsec tunnel being NATed (Network Address Translated) through customer premises router 103, the IPsec tunnel (or portions thereof) may be referred to as being between customer premises router 103 and security gateway 141. Stated in other words, communication path 161 may be provided as a portion of an IPsec tunnel between customer premises router 103 and security gateway 141.

Accordingly, a secure communications path may be provided between customer premises base station 101 and wireless network 149. In addition, broadband network 133 may include Broadband Policy Charging Function (BPCF) server 133 that is configured to provision available broadband network resources. Accordingly, BPCF server 133 may provision available broadband network resources to customer premises base station 101, and more particularly, BPCF server 133 may provision available broadband network resources to customer premises base station 101 responsive to requests/communications from PCRF server 145 of wireless network 149.

Wireless network 149 may thus communicate with and/or control operation of customer premises base station 101 using the link through communication path 161 and customer premises router 103. During active communication (e.g., during a radiotelephone conversation, an Internet browsing session, etc.) with wireless terminal 105 operating in customer premises 107, communications may be transmitted over communications path 161, for example, using packet data network gateway 143, mobility management entity 151, etc. to support communication with other devices (e.g., servers, wireless terminals, radiotelephones, wired telephones, etc.) through wireless communication network 149, other wireless communication networks, conventional wired telephone networks, the Internet, etc. In addition, mobility management entity 151 may use the link through communication path 161 and customer premises router 103 to control hand-offs of service for wireless terminal 105 between customer premises base station 101 and wireless network base stations 121a-c, to route incoming calls for wireless terminal 105, etc. so that operation of customer premises base station 101 may be transparent with respect to wireless terminal 105.

Figure 2:
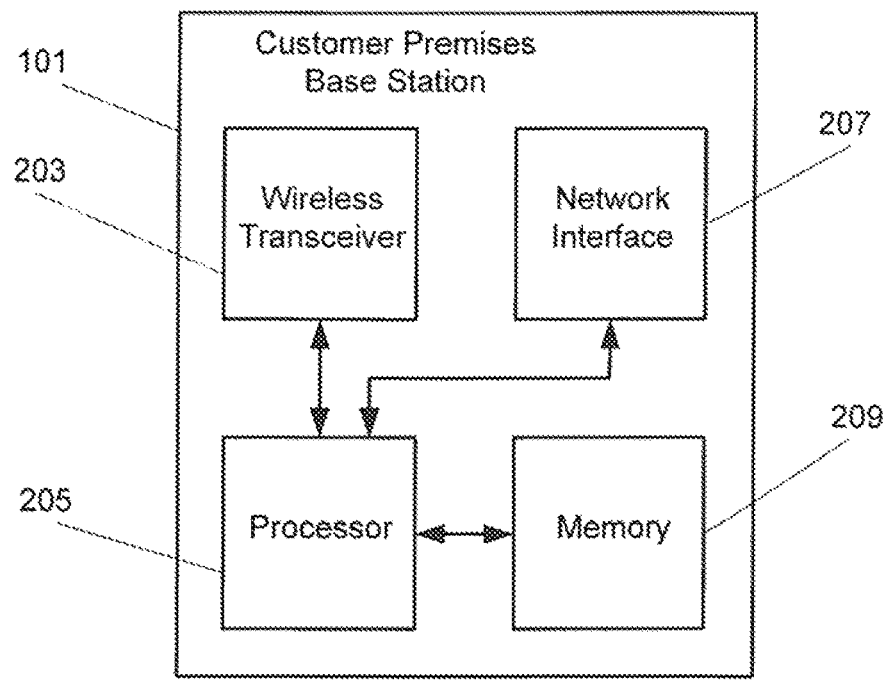
FIG. 2 is a block diagram illustrating a customer premises eNodeB of FIG. 1 according to some embodiments.
Figure 3:
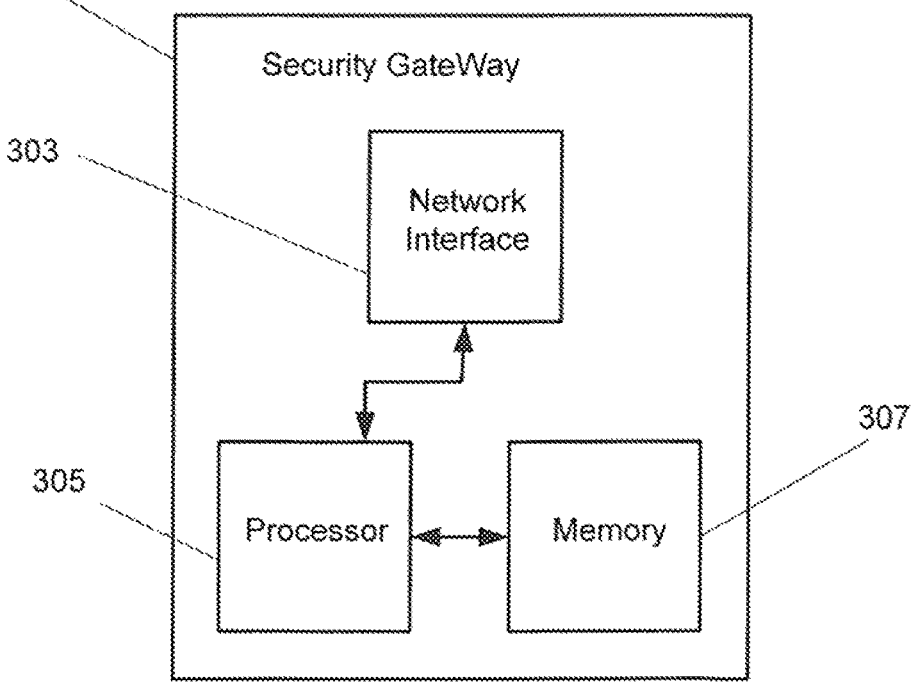
FIG. 3 is a block diagram illustrating a security gateway of FIG. 1 according to some embodiments.

For purposes of further discussion, customer premises base station 101 may include network interface 207, processor 205, memory 209 and wireless transceiver 203 as shown in FIG. 2. Network interface 207 may be configured to provide a communication interface with customer premises router 103 (and/or with another network element or elements), wireless transceiver 203 may be configured to provide communication with wireless terminal 105 over an air interface using a radio communication channel(s) according to a Radio Access Technology or RAT used by wireless network base stations, and processor 205 may be configured to control operations of network interface 207 and wireless transceiver 203 responsive to program instructions and/or information maintained in memory 209. Security gateway 141 may include network interface 303, processor 305, and memory 307. More particularly, network interface 303 may be configured to provide communication interfaces with broadband network 135 and with packet data network gateway 143, and processor 305 may be configured to control operations of network interface 303 responsive to program instructions and/or information maintained in memory 307.

Communications between and operations of customer premises base station 101 and security gateway 141 are discussed herein by way of example according to some embodiments. Customer premises base station 101 and security gateway 141, however, are discussed herein as examples of two different peer devices that are coupled through a communications path. Accordingly, peer devices and couplings/communications therebetween and operations thereof may be implemented using other devices according to other embodiments.

According to some embodiments of the present invention, a peer device (e.g., customer premises base station 101) operating behind or communicating through a NAT device (e.g., customer premises router 103) may be able to discover a public reachability address (e.g., IPv4 address and UDP source port) used to direct communications through a broadband network and through the NAT device to the peer device. The peer device (e.g., customer premises base station 101) may then provide its public reachability address to an element or elements of other networks (e.g., to an element or elements of wireless network 149 and/or broadband network 135). The public reachability address may then be used, for example, to provision broadband network resources to the peer device. Operations of customer premises base station 101 and security gateway 141 (as examples of peer devices) will now be discussed in greater detail with respect to the flow charts of FIGS. 4A, 4B, 5A, and 5B.

According to some embodiments, operations of customer premises base station 101 and security gateway 141 may be provided as shown in FIGS. 4A and 5A, with operations of customer premises base station shown in FIG. 4A and with operations of security gateway 141 shown in FIG. 5A. At block 401 of FIG. 4A and at block 501 of FIG. 5A, customer premises base station 101 and security gateway 141 may establish communications path 161 through broadband network 135 with customer premises router 103 being coupled between customer premises base station 101 and communications path 161. More particularly, communication path 161 may be an Internet Protocol Security (IPsec) tunnel between customer premises router 103 and security gateway 141 in accordance with an Internet Key Exchange (IKE) protocol (e.g., IKEv2). Although such an IPsec tunnel may be effectively between customer premises base station 101 (a first IKEv2 peer device) and security gateway 141 (a second IKEv2 peer device) with the IPsec tunnel being NATed (Network Address Translated) through customer premises router 103, the IPsec tunnel (or portions thereof) may be referred to as being between customer premises router 103 and security gateway 141. Stated in other words, communication path 161 may be provided as a portion of an IPsec tunnel between customer premises router 103 and security gateway 141.

At block 503 of FIG. 5A, security gateway 141 may transmit a first communication through communication path 161 and customer premises router 103 to customer premises base station 101. The first communication may be addressed to customer premises base station 101 using a public reachability address for customer premises base station 101 including an Internet Protocol (IP) address (e.g., an IPv4 address) of customer premises router 103 and a UDP source port number of router 103 associated with base station 101. In addition, a payload of the first communication may include a digest of the public reachability address that is generated using a hash function. Stated in other words, an address header portion of the first communication may include the public reachability address, and a payload of the first communication may include the digest of the public reachability address.

As set forth in RFC 4306, for example, a payload of the first communication may include AT_DETECTION_SOURCE_IP and AT_DETECTION_DESTINATION_IP information in an IKE-SA-INIT packet. The AT_DETECTION_SOURCE_IP may include a Security Hash Algorithm SHA-1 digest (hash) of security parameters index (SPI) for security gateway 141 including the public reachability address of security gateway 141, and the AT_DETECTION_DESTINATION_IP may include a Security Hash Algorithm SHA-1 digest (hash) of security parameters index (SPI) for base station 101 including the public reachability address of base station 101 (e.g., including the IP address of router 103 and the UDP source port number of router 103 associated with base station 101). Stated more generally, an address header of the first communication may include the public reachability address of base station 101, and a derivation of the public reachability address (e.g., a digest of the public reachability address computed using a hash function) may be included in a payload of the first communication.

The first communication may be transmitted by security gateway 141 over communication path 161 through broadband network 135 to router 103 which may retransmit the first communication to base station 101. Router 103, however, may act as a Network Address Translation (NAT) device, converting the public reachability address to a private address of base station 101 used to distinguish different customer premises devices coupled to router 103 at customer premises 107. More particularly, the private address may be provided to base station 101 by router 103, and router 103 may provide different private addresses to each customer premises device coupled thereto. When the first communication is transmitted from router 103, the public reachability address may no longer be included in an address field. The derivation (e.g., digest) of the public reachability address, however, may be maintained in the payload of the first communication that is transmitted from router 103 to base station 101.

The first communication including the derivation (e.g., digest) of the public reachability address may thus be received at base station 101 through network interface 207 at block 403 of FIG. 4A. At blocks 405 and 407 of FIG. 4A, processor 205 of base station 101 may compare the public reachability address (used by security gateway 141 for the first communication) and an address or addresses of base station 101 from memory 209. More particularly, processor 205 of base station 101 may generate a derivation (e.g., digest) of its address (or addresses) from memory 209, and the derivation(s) of its address (or addresses) may be compared with the derivation (e.g., digest) of the public reachability address that was included in the payload of the first communication (e.g., the digest from the AT_DETECTION_DESTINATION_IP information) generated by security gateway 141. If processor 208 of base station 101 determines that there is a match between derivations of addresses at block 407 of FIG. 4A, no address translation has occurred between security gateway 141 and router 103 and further operations of FIGS. 4A and 5A may be omitted (as indicated by the "No" outputs from blocks 407 and 505 of FIGS. 4A and 5A).

If processor 205 of base station 101 determines that there is no match between derivations at block 407 of FIG. 4A, processor 205 may determine that address translation has occurred and that router 103 is thus present between base station 101 and security gateway 141. Responsive to such a determination, processor 205 of base station 101 may generate a request for the public reachability address, and processor 205 may transmit the request through network interface 207, through router 103, and through communication path 161 to security gateway 141 at block 409 of FIG. 4A. For example, the request may be transmitted as a communication including a "Configure Request" indication in a Configuration Payload (CP) portion of the communication.

The request for the public reachability address may thus be received through network interface 303 of security gateway 141 at blocks 505 and 507 of FIG. 5. Responsive to receiving the request, processor 305 of security gateway 141 may generate a response communication wherein a payload of the response communication includes the public reachability address used by security gateway 141 to transmit the communication to base station 101, and the response communication may be transmitted through network interface 303 of security gateway 141, through communication path 161, and through router 103 to base station 101 at block 509 of FIG. 5A. For example, the response communication may include the public reachability address in a "Configure-Reply" message of a Configuration Payload (CP) portion of the response communication. Accordingly, processor 305 may include the public reachability address in both an address header portion of the response communication and in a payload portion of the response communication so that the public reachability address may be received at base station 101 even though address translation occurs at router 103.

The response communication including the public reachability address may then be received through network interface 207 of base station 101 at block 411 of FIG. 4A. Because the public reachability address is included in a payload portion of the response communication, processor 205 of base station 101 may receive the public reachability address even though address translation occurred at router 103, and processor 205 may store the public reachability address in memory 209 for future use. At block 415 of FIG. 4A, for example, processor 205 may transmit a communication including the public reachability address for base station 101 through network interface 207, router 103, communication path 161, and security gateway 141 to other elements of wireless network 149. The communication including the public reachability address for base station 101 may be received through network interface 303 of security gateway 141 at block 519 of FIG. 5, and processor 305 may retransmit the communication through network interface 303 to another element or elements of wireless network 149 such as mobility management entity 151 and/or PCRF server 145. At block 521 of FIG. 5A, for example, the communication including the public reachability address for base station 101 may be used by mobility management entity 151 and/or PCRF server 145 to identify a coupling of communication path 161 through broadband network 135 between base station 101 and security gateway 141 and to provision available broadband network resources to customer premises base station 101 by transmitting instructions/information to BPCF server 133 of broadband network 135.

As discussed above with respect to FIGS. 4A and 5A, by way of example, a first peer device (e.g., base station 101) may detect that it is operating behind a NAT device (e.g., router 103) by comparing a derivation (e.g., digest) of its own address (e.g., a private address if the first peer device is operating behind a NAT device such as router 103) with a derivation (e.g., digest) of the public reachability address provided as a payload element in a communication from a second peer device (e.g., security gateway 141). Upon detecting that it is operating behind a NAT device, the first peer device may transmit a request for its public reachability address, and the second peer device may respond with a communication including the public reachability address as a payload element of the response. The first peer device may thus save its public reachability address in memory for future use, for example, to facilitate subsequent provisioning of network resources.

According to other embodiments, providing a public reachability address may be initiated by events/operations other than those shown in FIGS. 4A and 5A. By way of example, security gateway 141 may initiate providing a public reachability address to base station 101 responsive to detecting a change of a public reachability address for base station 101 as discussed in greater detail below with respect to FIGS. 4B and 5B.

At block 401' of FIG. 4B and at block 501' of FIG. 5B, customer premises base station 101 and security gateway 141 may establish communications path 161 through broadband network 135 with customer premises router 103 being coupled between customer premises base station 101 and communications path 161. More particularly, communication path 161 may be an Internet Protocol Security (IPsec) tunnel between customer premises router 103 and security gateway 141 in accordance with an Internet Key Exchange (IKE) protocol (e.g., IKEv2) as discussed above with respect to FIGS. 4A and 5A. Although such an IPsec tunnel may be effectively between customer premises base station 101 (a first IKEv2 peer device) and security gateway 141 (a second IKEv2 peer device) with the IPsec tunnel being NATed (Network Address Translated) through customer premises router 103, the IPsec tunnel (or portions thereof) may be referred to as being between customer premises router 103 and security gateway 141. Stated in other words, communication path 161 may be provided as a portion of an IPsec tunnel between customer premises router 103 and security gateway 141.

Processor 305 of security gateway 141 may generate a communication wherein a payload of the communication includes a first public reachability address used by security gateway 141 to transmit the communication to base station 101. The communication may be transmitted through network interface 303 of security gateway 141, through communication path 161, and through router 103 to base station 101 at block 509' of FIG. 5B, and the communication including the first public reachability address may be received through network interface 207 of base station 101 at block 411' of FIG. 4B. By way of example, operations of blocks 401' and 411' of FIG. 4B may be performed as discussed above with respect to blocks 401 to 411 of FIG. 4A, and operations of blocks 501' and 509' of FIG. 5B may be performed as discussed above with respect to blocks 501 to 509 of FIG. 5A. Stated in other words, the communication including the first public reachability address may be initiated responsive to processor 205 of base station 101 detecting the presence of a NAT device (e.g., router 103) and requesting the public reachability address.

Communications between security gateway 141 and base station 101 may proceed using the first public reachability address until a public reachability address for base station 101 changes at block 511 of FIG. 5B. A public reachability address for base station 101 may change, for example, if an IP address of router 103 changes and/or if a UDP source port of router 103 that is assigned to base station 101 changes. Such a change may occur when a previous session between customer premises base station 101 and security gateway 141 is lost/terminated and a new session is initiated. A previous session may be lost, for example, due to the previous session timing out (e.g., due to inactivity), due to power loss (e.g., at base station 101, router 103, security gateway 141, etc.), and/or due to other loss of service.

Responsive to processor 305 of security gateway 141 detecting a change to a second public reachability address used to transmit communications to base station 101 at block 515 of FIG. 5B, processor 305 of security gateway 141 may generate a second communication wherein a payload of the second communication includes the second public reachability address used by security gateway 141 to transmit the communication to base station 101. The second communication may be transmitted through network interface 303 of security gateway 141, through communication path 161, and through router 103 to base station 101 at block 517 of FIG. 5B, and the communication including the second public reachability address may be received through network interface 207 of base station 101 at block 417 of FIG. 4B. The second communication may include an IKE INFORMATIONAL packet in accordance with the IKEv2 protocol including a configuration payload (CP) type "Configure-Set," and the CP attribute AT-External-NAT-Info may be included with the second public reachability address of base station 101, for example, including an IP (e.g, IPv4) address of router 103, a protocol type (e.g., UDP), and a source port of router 103 associated with base station 101.

Processor 205 of base station 101 may generate an Acknowledge message responsive to receiving the second communication including the second public reachability address, and processor 205 may transmit the Acknowledge message through network interface 207, router 103, and communication path 161 to security gateway 141 at block 419 of FIG. 4B. According to some embodiments, the Acknowledge message may be provided as an IKE Informational message with a configuration payload (CP) type "CONFIG-ACK" without any other CP attributes. In this case, base station 101 may acknowledge receiving the communication including the second public reachability address while rejecting the update. Processor 205 may then transmit a request for the second public reachability address, for example, using operations discussed above with respect to blocks 409 and 411 of FIG. 4A and blocks 507 and 509 of FIG. 5A, or processor 205 may take no further action regarding the change in public reachability address with knowledge/risk that its public reachability may be disrupted.

According to some other embodiments, the Acknowledge message may be provided as an IKE Informational message with a configuration payload (CP) type "CONFIG-ACK" and including a CP attribute "AT-NAT-External-info" with the same second public reachability address as received from security gateway 141. In this case, base station 101 may acknowledge accepting the second public reachability address transmitted from security gateway 141. The CP attribute "AT-NAT-External-info" may have a type value from values that are reserved for the Internet Numbering Agency IANA (from range: 16-16383), and this CP attribute may include: a NAT public IPv4 address (e.g., an IP address for router 103); a NAT protocol type (e.g., UDP); and a NAT source port address (e.g., a source port of router 103 associated with base station 101).

Either acknowledge message may be received at security gateway 141 through network interface 303 at block 518 of FIG. 5B, and communications may proceed accordingly. Provided that the processor 205 of base station 101 accepts the second public reachability address (immediately and/or using an additional request/response), base station 101 may transmit the second public reachability address through security gateway 141 to mobility management entity 151 at block 415 of FIG. 4B. Mobility management entity 151 may receive the second public reachability address at block 519 of FIG. 5B, and mobility management entity may use the second public reachability address to identify a coupling of communication path 161 through broadband network 135 at block 521 of FIG. 5B. Operations of blocks 415, 519, and 521 of FIGS. 4B and 5B may be the same as those discussed above with respect to the same numbered blocks of FIGS. 4A and 4B.

When a peer device (e.g., base station 101) requests its public reachability address using an IETF based implementation, a new IETF CP attribute may have the name "AT-External-NAT-INFO," and this attribute may use a type value from values that are reserved for IANA (the Internet Numbering Agency) [from range: 16-16383]. Moreover, this attributed may include a NAT public IPv4 address of the NAT device (e.g., router 103), NAT protocol type of the NAT device (e.g., UDP), and NAT source port of NAT device (e.g., UDP source port of router 103 associated with base station 101).

When a peer device (e.g., security gateway 141) sends an update of a public reachability address using an IETF based implementation, the peer device may send an IKE Informational packet following existing IKE protocol procedures, and the IKE Informational packet may include a CP type set to "CONFIG-SET" together with the IETF CP attribute "AT-External-NAT-INFO." Content of the attribute may include the updated public reachability address including the new IP (e.g., IPv4) address and/or NAT UDP source port of the NAT device (e.g., router 103).

When a peer device (e.g., base station 101) requests its public reachability address using a vendor specific implementation, a new SDO or Standards Development Organization may be provided (e.g., for 3GPP, 3GPP2, etc.) with a specific Configuration Payload (CP) attribute, for example, having the name AT-External-NAT-INFO. This attribute may use a type value from the values that are reserved for private use but unique within the specific SDO [Private Use range: 1634-32767], and the attribute may include a NAT public IPv4 address of the NAT device (e.g., router 103), NAT protocol type of the NAT device (e.g., UDP), and NAT source port of NAT device (e.g., UDP source port of router 103 associated with base station 101). To provide that the peer devices (e.g., security gateway 141 and base station 101) understand that the new attribute is defined within the specific SDO domain, the IKE payload Vendor Identification (ID) should be included with a value set to the specific SDO ID, e.g., 3GPP, 3GPP2, etc.

When a peer device (e.g., security gateway 141) sends an update of a public reachability address using a vendor specific solution, the peer device may send an IKE Informational packet as discussed above using vendor specific rules such that a type value from the values that are reserved for private use but unique within the specific SDO [Private Use range: 1634-32767] is used, and such that the IKE payload Vendor Identification (ID) should be included with a value set to the specific SDO ID, e.g., 3GPP, 3GPP2, etc. In addition, because the CP type "CFG_SET" use is currently not defined in IETF standards, a CP type that is vendor specific could be used to achieve the same functionality. Moreover, IKE peer devices should include the Vendor ID payload in the IKE Informational exchange with the vendor specific ID included in a VID (Vendor ID) field.

According to some embodiments, a NAT public reachability address may be requested using an IKE Configuration Payload (CP) during an IKE-AUTH Exchange. An IKE peer device (e.g., base station 101) may request its NAT public reachability address from another IKE peer device (e.g., security gateway 141) using a new IKE Configuration Payload attribute as discussed in greater detail below.

After the IKEv2 initiator client/host peer (e.g., base station 101) discovers that it is behind a NAT device (e.g., router 103) after exchanging IKE-SA-INIT with AT_DETECTION_SOURCE_IP and AT_DETECTION_DESTINATION_IP Notify payloads, the IKEv2 initiator peer (e.g., base station 101) may use the following procedure to discover its NAT public reachability address. First, the IKEv2 initiator peer (e.g., base station 101) will include the AT-External-NAT-Info attribute in addition to other configuration attributes (e.g., Internal-IP4-Address) with the CP type set to "Configure-Request" inside the IKE-AUTH request. Next, the IKEv2 initiator peer (e.g., base station 101) will set the values of the AT-External-NAT-Info fields to all zeros to indicate a request for its NAT public reachability address. After the IKEv2 responder peer (e.g., security gateway 141) validates the IKE-AUTH request, IKEv2 responder peer (e.g., security gateway 141) in the IKE-AUTH response by including the CP with type "Configure-Reply" and including the AT-External-NAT-Info in addition to other CP attributes and/or IKEv2 functionality. The IKEv2 responder peer (security gateway 141) sets the values of the AT-External-NAT-Info to the following values: NAT Protocol Type=protocol type of the NATed IKE-SA-INIT request packet (UDP); NAT UDP Source Port=Source port of the packet of the IKE-SA-INIT request; and NAT IPv4 Address=Source IPv4 address of the IKE-SA-INIT request packet received from the IKEv2 initiator. After the IKEv2 initiator peer (e.g., base station 101) receives and validates the IKE-AUTH response, it extracts the NAT IPv4 address and source port from the AT-External-NAT-Info and communicates these values to another network element (e.g., mobility management entity 151 and/or PCRF server 145) using other means between the host and the other network element.

According to some embodiments, a NAT public reachability address may be requested using an IKE CP during an IKE-Informational Exchange. This embodiment is similar to embodiments discussed above using an IKE CP during an IKE-AUTH exchange except that: the IKE peers (e.g., base station 101 and security gateway 141) use IKE CP (CFG_REQUEST/CFG_REPLY) and CP attribute AT-External-NAT-Info during an IKE-Information exchange; and either IKE peer (e.g., base station 101 or security gateway 141) can initiate this IKE-Information exchange for a NAT Public Reachability Request. With an IKE-ATH exchange discussed above, the initiating IKE Peer (e.g., base station 101) may only use the IKE-AUTH exchange after it detects that it is behind a NAT device (e.g., router 103) after the IKE-SA-INIT exchange as described in IKEv2 protocol.

According to some embodiments, a NAT public reachability address may be updated using an IKE configuration payload (CP) with type "CFG_SET". In the following discussion, the updating IKE peer (e.g., security gateway 141) that provides the update may initiate updating the NAT public reachability address, and the updated IKE peer (e.g., base station 101) may be the device for which the NAT public reachability address is being updated. After the IKEv2 peers (e.g., security gateway 141 and base station 101) have execute a NAT public reachability address request procedure as described above, the updating IKE peer (e.g, security gateway 141) may detect a change of the NAT public reachability address for updated IKE peer (e.g., base station 101). For example, the updating peer device (e.g., security gateway 141) may detect that the NAT public reachability IPv4 address and/or the NAT UDP source port number for the updated peer device (e.g., base station 101) have changed. The updating IKE peer (e.g., security gateway 141) may proceed with updating as discussed below.

The updating IKEv2 peer (e.g., security gateway 141) may send an initial IKE-Informational packet with the IKE Configuration Payload type set to "CFG_SET" and including the CP attribute AT-External-NAT-Info with the new NAT public reachability address for the updated IKE peer (e.g., base station 101). After the updated IKEv2 peer (e.g., base station 101) receives and validates the initial IKE-Informational packet, the updated IKE peer (e.g., base station 101) responds by sending a response IKE-Informational packet. The response IKE-Informational packet may comply with current IKEv2 procedures, and the response IKE-Information packet may include the CP with type set to "CFG_ACK" and the CP attribute "AT-External-NAT-Info" with the NAT public reachability address values that are the same as those received in the initial IKE-Informational packet to indicate acceptance of the new updated NAT public reachability address. In an alternative, the response IKE-Information packet may include the CP type "CFG-ACK" and the CP attribute "AT-External-NAT-Info" with all fields set to ZERO to indicate that the updated peer (e.g., base station 101) is not accepting the new NAT public reachability address of the IKE Informational exchange. The updated IKE peer (e.g., base station 101) may then initiate the NAT Public Reachability Request procedure as discussed above. If the updated IKE peer (e.g., base station 101) accepts the updated NAT public reachability address, the updated IKE peer may update any network elements that are tracking its NAT public reachability with the new NAT public reachability address.

A format of an AT-External-NAT-Info CP attribute is illustrated in FIG. 6 by way of example according to some embodiments. As shown, a first row may include one reserved bit R, 7 bits for an identification of the attribute (Attr. AT-EXT-NAT-Info), and 8 bits identifying a length of the attribute. The second row may include an 8 bit field to identify the protocol type (e.g., UDP) and another 8 bit field to identify the source port number. The third row may include a 16 bit field to identify the IPv4 address of the NAT device (e.g., router 103).

Additional embodiments that allow an IKEv2 peer device (e.g., base station 101) to discover its NAT public reachability address (e.g., the public IPv4 address of router/NAT device 103 and the UDP source port number of router/NAT device 103 associated with base station 101) are discussed below.

According to first examples of embodiments, an IKEv2 initiator peer device (e.g., base station 101) may receive an IETF IKE configuration payload attribute with a type value from a range reserved to IANA [16-16383]. In this embodiment, the IKEv2 initiator peer device (e.g., base station 101) is behind a NAT device (e.g., router 103) and coupled to another IKEv2 peer (e.g., Security Gateway 141 that is not behind a NAT device and with a public IP address) over IKEv2 IPsec tunnel. The IKEv2 initiator peer device (e.g., base station 101) may use a CP attribute AT-External-NAT-Info with a type value selected from one reserved for IANA [16-16383]. In this case, the IKEv2 initiator peer (e.g., base station 101) may be able to communicate and use this functionality with any other IKEv2 peer (e.g., Security Gateway 141) that is compliant with IETF IKE standard. After the IKEv2 initiator peer (e.g., base station 101) detects that it is behind a NAT device (e.g., router 103) using the IKEv2 NAT detection mechanism, the IKEv2 initiator peer (e.g., base station 101) may include the AT-External-NAT-Info CP attribute in a CP type "CFG_REQUEST" with the protocol field, port field and the NAT IP address field all set to zeros. When the IKEv2 initiator peer (e.g., base station 101) receives the IKE-AUTH response from the responder IKEv2 peer (e.g, security gateway 141) with the CP type "CFG-REPLY", IKEv2 initiator peer (base station 101) may validate the IKE-AUTH response and check whether the CP includes the AT-External-NAT-Info. Then, the IKEv2 initiator peer (e.g., base station 101) may extract and save the NAT public reachability address. The IKEv2 initiator peer (e.g., base station 101) may use the same NAT public reachability address for IKEv2, ESP (Encapsulating Security Payload) protocol, and/or AH (Authentication Header) protocol traffic if applicable. The IKEv2 initiator peer (e.g., base station 101) may communicate its NAT public reachability address to another network element or elements. For example, customer premises base station 101 (e.g., a Home eNodeB) may communicate its NAT public reachability address to mobility management entity (MME) 151 to be communicated to the PCRF server 145 and/or server BPCF 133.

According to second examples of embodiments, an IKEv2 initiator peer (e.g., base station 101) may obtain its NAT public reachability address using a vendor specific IKE Configuration Payload (CP) attribute with a type value from the private range [16384-32767]. Differences in these second examples of embodiments relative to the first examples of embodiments are discussed as follows. The type of the AT-External-NAT-Info is used from the range that is reserved for private use [16384-32767]. Moreover, the reserved type (e.g., [16384-32767]) may be specific to the Vendor (Standard Development Organization) that is making the reservation and it should be unique within the scope of this organization; e.g., 3GPP, 3GPP2, etc. In addition, when the IKEv2 initiator peer (e.g., base station 101) uses the private use AT-External-NAT-Info attribute, the IKEv2 initiator peer should include the IKEv2 Vendor ID payload with the payload value set to the reserved value for the SDO that made the reservation of the AT-External-NAT-Info type; (e.g., 3GPP, 3GPP2, etc). The IKEv2 Vendor ID is used to indicate to the IKEv2 responder that this CP attribute type value belongs to the SDO and that its ID is included in the Vendor ID payload. If the IKEv2 responder peer (e.g., security gateway 141) supports the definition of the AT-External-NAT-Info and the logic as per the specification of the organization whose ID is communicated inside the Vendor ID payload, the IKEv2 responder peer may process the IKE-AUTH and the CP per the SDO standardization and embodiments discussed herein and may communicate back the NAT public reachability address in a AT-External-NAT-Info. In this case, the IKEv2 responder peer (e.g., security gateway 141) may include the IKE Vendor ID with the same ID as the one received in the IKE-AUTH Request.

According to third examples of embodiments, an IKEv2 initiator peer (e.g., base station 101) may obtain its NAT public reachability address using an IETF IKE Notify Payload with a type value from the range reserved to IANA [16396-40959]. Differences in these third examples of embodiments relative to the first examples of embodiments are discussed as follows. A new IETF IKE Notify Payload [AT-NAT-Reachability-Info] may be used by the IKEv2 responder peer (e.g., security gateway 141) to communicate the NAT public reachability address, and this Notify payload type may be selected from those reserved for IANA [16396-40959]. This Notify Payload should be included in an IKE-AUTH response with proper values as discussed above with respect to first examples of embodiments. This Notify Payload can be sent by the IKEv2 responder peer (e.g., security gateway 141) without receiving the same Notify payload from the IKEv2 initiator peer (e.g., base station 101) with all values of the fields in the Notify Payload set zeros in the IKE-AUTH request.

According to fourth examples of embodiments, an IKEv2 initiator peer (e.g., base station 101) may obtain its NAT public reachability address using a vendor specific IKE Notify Payload with a type value selected from the range reserved to IANA [40960-65535]. Differences in these fourth examples of embodiments relative to the third examples of embodiments are discussed as follows. A new vendor specific IKE Notify Payload may be used by the IKEv2 responder peer (e.g., security gateway 141) to communicate the NAT public reachability address, and this Notify payload type may be selected from those reserved for IANA [40960-65535]. In addition, the specific vendor reserved ID should be included in the Vendor ID payload.

According to fifth examples of embodiments, an IKEv2 peer (e.g., security gateway 141) may update its corresponding IKEv2 peer (e.g., base station 101) using an IKE Informational packet request with CP type "CFG_SET" and IETF compliant AT-EXTERNAL-NAT-Info CP attribute with the attribute type value selected from the range reserved to IANA [16-16383]. In the fifth examples of embodiments, the updating IKEv2 peer (e.g., security gateway 141) initiates the IKEv2 NAT Public Reachability Update procedure and also provides the updated public reachability address for the updated IKEv2 peer (e.g., base station 101). After executing the NAT Public Reachability Request procedure, the updating IKE peer (e.g., security gateway 141) may detect that the NAT public reachability address (e.g., the NAT public IPv4 address or the NAT UDP source port number or both) for its IKE peer (e.g., base station 101) has been changed. The updating IKEv2 peer (e.g., security gateway 141) sends an IKE-Informational packet (request) including the CP type "CFG_SET" and the IETF compliant CP attribute AT-EXTERNAL-NAT-INFO (with an attribute type value from range reserved to IANA [16-16383]) with all values of all fields set to the new NAT public reachability address of its IKE peer (e.g., base station 101) that was detected.

After the updated IKEv2 peer (e.g., base station 101) receives and validates the IKE-Informational packet (request), it extracts the updated NAT public reachability address from the CP attribute "AT-EXTERNAL-NAT-INFO" proceeds as follows. The updated IKEv2 peer (e.g., base station 101) may follow the current IKEv2 procedure for sending an IKE Informational packet (response). The response may include the CP with type set to "CFG_ACK" and the CP attribute "AT-External-NAT-Info" with the NAT public reachability address values set as in the IKE-Informational packet (request) to indicate acceptance of the new updated NAT public reachability information. In an alternative, the response may include the CP type "CFG_ACK." Moreover, the response may include the CP attribute "AT-External-NAT-Info" with all fields set to zero, or the response may not include the CP attribute AT-External-NAT-Info in the CP, or the response may omit the CP all together to indicate that the new NAT public reachability address is not being accepted as per this IKE Informational exchange. The updated IKE peer (e.g., base station 101) may then initiate the NAT Public Reachability Request procedure as per the first examples of embodiments. If the updated IKE peer (e.g., base station 101) accepts the new updated NAT public reachability address, the updated IKE peer (e.g., base station 101) may update any network elements that are tracking its NAT public reachability with the new NAT public reachability address.

According to sixth examples of embodiments, an updating IKEv2 peer (e.g., security gateway 141) may update a corresponding updated IKEv2 peer (e.g., base station 101 using an IKE Informational packet request with the CP type CFG_SET and vendor specific AT-EXTERNAL-NAT-Info CP attribute, for example, using a type value from the private range [16384-32767]. Differences in these sixth examples of embodiments relative to the fifth examples of embodiments are discussed as follows. The type of the AT-External-NAT-Info will be selected from the range that is reserved for private use [16384-32767], and the reserved type will be specific to the Standard Development Organization that is making the reservation and should be unique with the scope of this organization (e.g., 3GPP, 3GPP2, etc.). When using the vendor specific AT-External-NAT-Info attribute, the updating IKEv2 peer (e.g., security gateway 141) includes the IKEv2 Vendor ID payload with the payload value set to the reserved value for the SDO that made the reservation of the AT-External-NAT-Info (e.g., 3GPP, 3GPP2, etc.). The IKEv2 Vendor ID is used to indicate to the IKEv2 peer that this CP attribute type value can be interpreted as per the SDO (whose ID is included in the Vendor ID payload) specifications. If the IKEv2 peer supports the definition of the AT-External-NAT-Info and the logic as per the specification of this vendor/organization whose ID is provided in the Vendor ID payload, the updated IKEv2 peer (base station 101) processes the IKE-Informational packet (request) and the CP per the SDO standardization and embodiments discussed herein and responds with an IKE-Informational packet (response) including the CP type set "CFG_ACK" and the AT-External-NAT-Info. In this case, the updated IKEv2 peer (e.g., base station 101) should include the IKE Vendor ID with the same ID as the one received in the IKE-Informational packet (request).

According to seventh examples of embodiments, an initiating IKEv2 peer (e.g., base station 101) may request an update from a responding IKEv2 peer (e.g., security gateway 141) using an IKE Informational packet request with the CP type CFG_SET and vendor specific AT-EXTERNAL-NAT-Info CP attribute, for example, using a type value from the private range [16384-32767]. An initiating IKEv2 peer (e.g., base station 101) may transmit a request for its public reachability address using an IKE-Informational packet (request) with the CP type CFG_REQUEST and IETF compliant AT-EXTERNAL-NAT-Info CP attribute (e.g., with a type value from the range reserved to IANA [16-16383]). Sometime after the initiating IKE peer (e.g., base station 101) detects that it is behind a NAT using current IKEv2 NAT detection procedures according to IKE IETF standards, the initiating IKEv2 peer (e.g., base station 101) may initiate an IKE-Informational exchange by sending an IKEv2-Informational packet (request) with the CP type "CFG_REQUEST" and including the IETF compliant AT-External-NAT-Info CP attribute (type value from the range reserved to IANA [16-16383]) with the type protocol field, port field, and the NAT IP address field all set to zeros. All zero values is used to indicate to the other (responding) IKE peer (e.g., security gateway 141) that this is a request for a NAT public reachability address.

The responding IKEv2 peer (e.g., security gateway 141) receives and validates IKE-Informational packet (request). Upon validating that the NAT public reachability address fields included in the CP attribute "AT-EXTERNAL-NAT-INFO" are all zeros, the responding IKE peer (e.g., security gateway 141) follows the current IKEv2 procedures for sending an IKE Informational packet (response), and it includes in the IKE-Informational packet (response) the CP with type set to "CFG_REPLY" and the CP attribute "AT-External-NAT-Info" with the NAT public reachability address values assigned to the initiating IKE peer (e.g., base station 101) as per the outer header of IKE packets and as discussed herein.

When the initiating IKEv2 peer (e.g., base station 101) receives the IKE-Informational packet (response) from the responding IKE peer (e.g., security gateway 141) with the CP type "CFG-REPLY", it validates the IKE-Informational packet (response) and checks whether the CP includes the AT-External-NAT-Info. Then, the initiating IKEv2 peer (e.g., base station 101) extracts and saves the NAT public reachability address. The initiating IKEv2 peer (e.g., base station 101) may then use the same NAT public reachability address for IKEv2, ESP, and/or AH traffic to the extent applicable. The initiating IKEv2 peer (e.g., base station 101) may communicate its NAT public reachability address to any other network elements that may be tracking its reachability for network initiated control/communication.

According to eighth examples of embodiments, an initiating IKEv2 peer (e.g., base station 101) may request an update from a IKEv2 peer (e.g., security gateway 141) using an IKE Informational packet request with the CP type CFG_REQUEST and vendor specific AT-EXTERNAL-NAT-Info CP attribute (e.g., type value from the private range [16384-32767]). Differences in these eighth examples of embodiments relative to the seventh examples of embodiments are discussed as follows. The type of the AT-External-NAT-Info is used from the range that is reserved for private use [16384-32767]. The reserved type may be specific to the Vendor (Standard Development Organization) that is making the reservation and it should be unique within the scope of this organization (e.g., 3GPP, 3GPP2, etc.). When the initiating IKEv2 peer (e.g., base station 101) uses the private use AT-External-NAT-Info attribute, the initiating IKEv2 peer may include the IKEv2 Vendor ID payload with the payload value set to the reserved value for the SDO that made the reservation of the AT-External-NAT-Info type (e.g., 3GPP, 3GPP2, etc). The IKEv2 Vendor ID is used to indicate to the responding IKEv2 peer (e.g., security gateway 141) that this CP attribute type value belongs to the SDO whose ID is included in the Vendor ID payload. If the responding IKEv2 peer (e.g., security gateway 141) supports the definition of the AT-External-NAT-Info and the logic as per the specification of the organization whose ID is communicated in the Vendor ID payload, the responding IKEv2 peer may process the IKE-Informational packet (request) and the CP per the SDO standardization and embodiments discussed herein and may communicate back the NAT public reachability address in the AT-External-NAT-Info. In this case, the responding IKEv2 peer includes the IKE Vendor ID with the same ID as the one received in the IKE-Informational packet (request).

Embodiments discussed herein may provide flexibility to use IKEv2 signaling between IKE peers when one or both of the peers may be located behind a NAT device and when the IKE peers are coupled through an IPsec tunnel using the IKEv2 protocol. A client such as a home eNodeB may thus be able to discover its NAT public reachability address and communicate its NAT public reachability address to other network elements for later communications. For example, a network and/or elements thereof may be able to initiate communication and/or send data to the client/host without maintaining a live connection with the client/host. Moreover, a network and/or elements thereof may be able to identify a fixed connection of the client/host behind the NAT device to enforce the proper QoS (Quality of Service). Embodiments discussed herein may thus enable an IKEv2 peer to discover its NAT public reachability without deploying or using a separate protocol (such as the IETF STUN protocol). In addition, embodiments discussed herein may also allow an IKEv2 peer (after learning that a corresponding IKEv2 peer NAT public reachability address has been updated) to update a corresponding IKEv2 peer with its updated NAT public reachability address using an IKE-Informational packet including a CP with type set to "CFG_SET"/CFG_ACK" as discussed herein.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of obtaining addressing information, the method comprising:
   establishing a communication path through a broadband network between first and second peer devices, wherein a Network Address Translate (NAT) router is coupled between the first peer device and the communication path which extends from the NAT router through the broadband network to the second peer device; and receiving a first communication at the first peer device from the second peer device through the communication path and the NAT router;

detecting, at the first peer device, that it is operating behind the NAT router based on the first communication; and receiving a second communication at the first peer device from the second peer device through the communication path and the NAT router, wherein a payload of the second communication received at the first peer device from the second peer device includes a public reachability address used by the second peer device to transmit the second communication through the broadband network and the NAT router to the first peer device, wherein the public reachability address comprises a first public reachability address, and wherein the public reachability address used by the second peer device to transmit the second communication to the first peer device includes an Internet Protocol (IP) address of the NAT router, the method further comprising:

detecting, at the second peer device, a change from the first public reachability address to a second public reachability address used by the second peer device to transmit communications to the first peer device through the communication path and the NAT router; and responsive to detecting the change to the second public reachability address, transmitting a third communication from the second peer device to the first peer device through the communication path and the NAT router, where a payload of the third communication includes the second public reachability address, and wherein the first peer device comprises a customer premises base station and the second peer device comprises a security gateway of a wireless communication network.

2. The method according to claim 1, wherein the public reachability address used by the second peer device to transmit the second communication to the first peer device further includes a source port number of the NAT router associated with the first peer device, and wherein the address of the first peer device comprises a private address provided by the NAT router to the first peer device.

3. The method according to claim 1, the method further comprising:

before receiving the second communication, receiving the first communication at the first peer device from the second peer device through the communication path and the NAT router, wherein the first communication is addressed by the second peer device using the public reachability address;

comparing at the first peer device the public reachability address used by the second peer device for the first communication and an address of the first peer device; and responsive to determining that the public reachability address fails to match the address of the first peer device, transmitting a request for the public reachability address from the first peer device to the second peer device through the NAT router and the broadband network, wherein the second communication is received at the first peer device after transmitting the request.

4. The method according to claim 3, wherein the first communication includes a derivation of the public reachability address, and wherein comparing the public reachability address with the address of the first peer device comprises comparing the derivation of the public reachability address and a derivation of the address of the first peer device.

5. The method according to claim 4, wherein the derivation of the public reachability address comprises a digest of a hash of the public reachability address, and wherein the derivation of the address of the first peer device comprises a digest of a hash of the address of the first peer device.

6. The method according to claim 5, wherein the public reachability address includes the Internet Protocol (IP) address of the NAT router and a source port number of the NAT router associated with the first peer device, and wherein the address of the first peer device comprises a private address provided by the NAT router to the first peer device.

7. The method according to claim 1, wherein the communication path comprises an Internet Protocol security tunnel between the NAT router and the security gateway through the broadband network.

8. The method according to claim 7, wherein the communication is received over the Internet Protocol security tunnel in accordance with an Internet Key Exchange protocol.

9. The method according to claim 7, the method further comprising:

responsive to receiving the first communication, the first communication including the public reachability address, transmitting a communication to the wireless communication network wherein a payload of the communication includes the public reachability address received with the first communication.

10. The method according to claim 9, wherein transmitting the communication comprises transmitting the communication to a mobility management entity of the wireless communication network.

11. A method of providing addressing information, the method comprising:

establishing a communication path through a broadband network between first and second peer devices, wherein a Network Address Translate (NAT) router is coupled between the second peer device and the communication path which extends from the NAT router through the broadband network to the first peer device; and transmitting a first communication from the first peer device to the second peer device through the communication path and the NAT router, wherein a payload of the communication includes a public reachability address used by the first peer device to transmit the first communication through the broadband network and the NAT router to the second peer device;

after transmitting the first communication including the public reachability address, receiving a second communication at a wireless communication network, wherein a payload of the second communication includes the public reachability address transmitted with the first communication, retransmitting the second communication to a mobility management entity of the wireless communication network, wherein the public reachability address comprises a first public reachability address, and wherein the public reachability address includes an Internet Protocol (IP) address of the NAT router and a source port number of the NAT router associated with the second peer device, and wherein the address of the second peer device comprises a private address provided by the NAT router to the second peer device, the method further comprising:
  detecting, at the first peer device, a change from the first public reachability address to a second public reachability address used by the first peer device to transmit communications to the second peer device through the communication path and the NAT router; and
  responsive to detecting the change to the second public reachability address, transmitting a third communication from the first peer device to the second peer device through the communication path and the NAT router, where a payload of the third communication includes the second public reachability address; and
  wherein the first peer device comprises a security gateway of the wireless communication network, wherein the second peer device comprises a customer premises base station.

12. The method according to claim 11, further comprising:
  before transmitting the first communication, receiving a request for the public reachability address from the second peer device at the first peer device, wherein transmitting the first communication comprises transmitting the first communication responsive to receiving the request.

13. The method according to claim 11, wherein the second public reachability address includes a second Internet Protocol (IP) address of the NAT router and/or a second source port number of the NAT router associated with the second peer device.

14. The method according to claim 11, wherein the communication path comprises an Internet Protocol security tunnel between the NAT router and the security gateway through the broadband network.

15. The method according to claim 14, wherein the first communication and the third communication are transmitted over the Internet Protocol security tunnel in accordance with an Internet Key Exchange protocol.

16. The method according to claim 14, further comprising:
  using the public reachability address received at the mobility management entity to identify a coupling of the Internet Protocol security tunnel through the broadband network between the customer premises base station and the security gateway and to provision available broadband network resources to the customer premises base station.

17. A first peer device configured to communicate with a second peer device through a broadband network and a Network Address Translate (NAT) router, the first peer device comprising:

a processor; and,
a memory that stores program instructions, wherein the processor interfaces with the memory to execute the program instructions, whereby the first peer device is configured to:
establish a communication path through the broadband network with the second peer device, wherein the NAT router is coupled between the second peer device and the communication path which extends from the NAT router through the broadband network to the first peer device;
transmit a first communication from the first peer device to the second peer device through the communication path and the NAT router, wherein a payload of the communication includes a public reachability address used by the first peer device to transmit the first communication through the broadband network and the NAT router to the second peer device;
after transmission of the first communication including the public reachability address, receive a second communication at a wireless communication network, wherein a payload of the second communication includes the public reachability address transmitted with the first communication,
retransmit the second communication to a mobility management entity of the wireless communication network,
wherein the public reachability address comprises a first public reachability address, and wherein the public reachability address includes an Internet Protocol (IP) address of the NAT router and a source port number of the NAT router associated with the second peer device, and wherein the address of the second peer device comprises a private address provided by the NAT router to the second peer device, the first peer device further configured to:
  detect, at the first peer device, a change from the first public reachability address to a second public reachability address used by the first peer device to transmit communications to the second peer device through the communication path and the NAT router; and
  responsive to the detection of the change to the second public reachability address, transmit a third communication from the first peer device to the second peer device through the communication path and the NAT router, where a payload of the third communication includes the second public reachability address; and
  wherein the first peer device comprises a security gateway of the wireless communication network, wherein the second peer device comprises a customer premises base station.

18. The first peer device according to claim 17, wherein the communication path comprises an Internet Protocol security tunnel between the NAT router and the security gateway through the broadband network.

* * * * *